US008407042B2

(12) United States Patent
Cancedda (10) Patent No.: US 8,407,042 B2
(45) Date of Patent: Mar. 26, 2013

(54) CROSS LANGUAGE TOOL FOR QUESTION ANSWERING

(75) Inventor: Nicola Cancedda, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1141 days.

(21) Appl. No.: 12/330,672

(22) Filed: Dec. 9, 2008

(65) Prior Publication Data

US 2010/0145673 A1      Jun. 10, 2010

(51) Int. Cl.
*G06F 17/28*      (2006.01)
(52) U.S. Cl. ............................................... 704/7; 704/3
(58) Field of Classification Search .................. 704/1–10
See application file for complete search history.

(56) References Cited

U.S. PATENT DOCUMENTS

| | | | |
|---|---|---|---|
| 5,477,451 A | 12/1995 | Brown et al. | |
| 5,948,054 A * | 9/1999 | Nielsen | 709/200 |
| 5,987,401 A * | 11/1999 | Trudeau | 704/2 |
| 6,182,026 B1 | 1/2001 | Tillmann et al. | |
| 6,304,841 B1 | 10/2001 | Berger et al. | |
| 7,146,358 B1 | 12/2006 | Gravano et al. | |
| 7,809,664 B2 * | 10/2010 | Heck | 706/46 |
| 2002/0143757 A1 * | 10/2002 | Borovoy et al. | 707/3 |
| 2003/0018468 A1 * | 1/2003 | Johnson et al. | 704/8 |
| 2003/0225862 A1 * | 12/2003 | Watanabe et al. | 709/219 |
| 2004/0024581 A1 | 2/2004 | Koehn et al. | |
| 2004/0030551 A1 | 2/2004 | Marcu et al. | |
| 2004/0049539 A1 * | 3/2004 | Reynolds et al. | 709/203 |
| 2004/0064305 A1 * | 4/2004 | Sakai | 704/9 |
| 2004/0128288 A1 | 7/2004 | Cancedda | |
| 2005/0076342 A1 | 4/2005 | Levins et al. | |
| 2006/0167874 A1 * | 7/2006 | von Ahn Arellano et al. | 707/6 |
| 2007/0150257 A1 | 6/2007 | Cancedda et al. | |
| 2007/0259325 A1 * | 11/2007 | Clapper | 434/350 |
| 2007/0265825 A1 | 11/2007 | Cancedda et al. | |

(Continued)

FOREIGN PATENT DOCUMENTS

| | | |
|---|---|---|
| EP | 1 156 430 | 11/2009 |
| JP | 2001-236347 | 8/2001 |

(Continued)

OTHER PUBLICATIONS

Braschler, et al., *Cross-Language Information Retrieval (CLIR) Track Overview*, in Proc. of the 8th Text Retrieval Conference (TREC-8) Nov. 16-19 1999.

(Continued)

*Primary Examiner* — Samuel G Neway
(74) *Attorney, Agent, or Firm* — Fay Sharpe LLP (57) ABSTRACT

A cross-language question answering system includes a server which hosts a plurality of community question answering (CQA) websites for different countries. The websites can generate a graphical user interface on an associated user terminal. A machine translation system translates a user question from a first language into a second language. The system may alert the user to similar questions posted on other CQA websites in other languages. The system may post the translated question on another CQA website and notify the user of answers to the translated question that are posted on the website by other users. The system may include memory which stores a plurality of archives, each including questions and answers posted on a corresponding one of the CQA websites. The system may allow a user to enter a query in the user's language and receive responses to the queries retrieved from the archives of other CQA websites.

25 Claims, 5 Drawing Sheets

U.S. PATENT DOCUMENTS

| | | | |
|---|---|---|---|
| 2008/0046516 A1* | 2/2008 | Hyoung et al. | 709/205 |
| 2008/0228759 A1* | 9/2008 | Maruhashi et al. | 707/5 |
| 2008/0262826 A1 | 10/2008 | Pacull | |
| 2008/0263132 A1* | 10/2008 | Saintloth | 709/203 |

FOREIGN PATENT DOCUMENTS

| | | |
|---|---|---|
| WO | WO 2008/056352 | 5/2008 |

OTHER PUBLICATIONS

Clinchant, et al., *Query Translation Through Dictionary Adaptation*, Lecture Notes in Computer Science, Advances in Multilingual and Multimodal Information Retrieval: 8th Workshop of the Cross-Language Evaluation Forum, CLEF 2007, Budapest, Hungary, Sep. 19-21, 2007, Revised Selected Paper published in *Advances in Multilingual and Multimodal Information Retrieval*, pp. 182-187, peters, et al., Eds. (2008).

Dumais, *Latent Semantic Analysis*, (ARIST), vol. 38, pp. 189-230 (2004).

Fortuna, et al., *Learning With Multiple Views*, Workshop at the ICML, Germany Aug. 11, 2005.

Gaussier, et al., *A Geometric View on Bilingual Lexicon Extraction from Comparable Corpora*, In *Proc. 42nd Annual Meeting of ACL-04*, Barcelona, Spain (2004).

Gaussier, et al., *A Hierarchical Model for Clustering and Categorising Documents*, In *Advances in Information Retrieval—Proc. of the 24th BCS-IRSG European Colloquium on IR Research (ECIR-02)*, Glasgow, Mar. 25-27 (2002). in Lecture Notes in Computer Science, pp. 229-247, Springer.

Hardoon, et al., *Canonical Correlation Analysis: An Overview with Application to Learning Methods*, In *Neural Computation*, 16:2639-2664 (2004).

Hofmann, *Unsupervised Learning by Probabilistic Latent Semantic Analysis*, Machine Learning, vol. 42, N. 1-2, Jan. 2001.

Katz, et al., *Answering English Questions Using Foreign-Language, Semi-Structured Sources*, In *Proc. of the 1st IEEE Intl. Conference on Semantic Computing (ICSC2007)*, pp. 439-445 (2007).

Katz, et al., *Natural Language Annotations for Question Answering*, In *Proc. of the FLAIRS*, pp. 303-306 (2006).

Katz, et al., *Omnibase: Uniform Access to Heterogeneous Data for Question Answering*, In *Proc. of the 7th Intl. Workshop on Applications of Natural Leanguage to Information Systems (NLDB'02)*, Stockholm Sweden, Jun. 2002.

Katz, et al., *Question Answering from Foreign-Language, Semi-Structured Sources* (2007) http://publications.csail.mit.edu/abstracts/abstracrs07/boris-multilingual/boris-multilingual.html.

Lopez, *Statistical Machine Translation*. ACM Computing Surveys, 40(3), art. 8, pp. 1-49 (2008).

Redners, et al. *D5.1 Lexicon Extraction for Cross-Language Information Access, Statistical Multilingual Analysis for Retrieval and Translation (SMART)*, Sep. 24, 2007, available at http://www.smart-proiect.eu/files/D51.pdf.

Shawe-Taylor, et al., *D5.2 Multilingual Latent Language-Independent Analysis Methods Applied to CLTIA Tasks, Statistical Multilingual Analysis for Retrieval and Translation (SMART)*, Mar. 24, 2008, avaliable at http://www.smart-project.eu/files/D52.pdf.

Simard, et al., *Translating With Non-Contiguous Phrases*, Proc. of the Conference on Human Language Technology and Empirical Methods in Natural Language Processing, Vancouver, British Columbia, Canada, pp. 755-762 (2005).

Vinokourov, et al., *Inferring a Semantic Representation of Text via Cross-Language Correlation Analysis*, In *Advances in Neural Infromation Processing Systems*, 2003.

\* cited by examiner

CROSS LANGUAGE TOOL FOR QUESTION ANSWERING

BACKGROUND

The exemplary embodiment relates to the field of question answering and finds particular application in connection with an interface for web-based community question answering which enables cross language querying and information mining.

Community question answering (CQA) websites allow users to post questions in their own language and respondents to post answers to those questions, often for a limited time period, such as a few days. The questions and answers are often archived, allowing subsequent users of the website to query the archive using keyword searching tools. Such websites exist for many countries. By way of example, Yahoo! Answers is a group of websites where users can post questions, and an active community provides answers. Such websites are organized by country. For example, Argentina, Australia, Brazil, Canada, China, France, Germany, Hong Kong, India, Indonesia, Italy, Japan, Malaysia, Mexico, New Zealand, Philippines, Quebec, Singapore, South Korea, Spain, Taiwan, Thailand, United Kingdom, United States, etc may each have their own website.

Where two countries use the same language, such as Argentina and Spain, users may be given the opportunity to search on their national site only or on all sites of the same language. Users of sites where the pool of respondents is relatively small, however, may receive few useful answers, particularly when the questions posed require knowledge not readily available to the respondent pool. For example, a user in Thailand may have a question about a soccer player in Brazil or education levels in a particular province in China.

Machine translation tools allow users to submit a chunk of text in one language and have the text translated into another language. Automated machine translations are also offered by search engines when a user's keyword query retrieves results in another language.

The exemplary embodiment provides an interface which allows users to pose questions and receive answers in their own language without having to navigate a website of a different country in an unfamiliar language.

INCORPORATION BY REFERENCE

The following references, the disclosure of which are incorporated in its entirety by reference, are mentioned:

Michel Simard, et al., Translating with non-contiguous phrases, Proceedings of the conference on Human Language Technology and Empirical Methods in Natural Language Processing, Vancouver, British Columbia, Canada, Pages: 755-762 (2005).

Yorick Wilks: Machine Translation: Its scope and limits, Springer, 2007; Cyril Goutte, Nicola Cancedda, Marc Dymetman and George Foster, Eds: Learning Machine Translation, MIT Press, 2009; Adam Lopez: Statistical machine translation. ACM Computing Surveys 40 (3), art. 8, August 2008, pp. 1-49; and U.S. Pub. No. 20070365825 to Cancedda, et al., and the references cited therein, describe a variety of machine translation methods.

BRIEF DESCRIPTION

In accordance with one aspect, a cross-language system for facilitating question answering includes a server which hosts a plurality of community question answering websites, one for each of a plurality of countries a first of the websites using a first language and a second of the websites using a second language, each of the websites configured for generating a graphical user interface to be displayed on a terminal of a user accessing the website. A machine translation system translates a question submitted by the user to the first website in the first language into the second language. The system is configured for at least one of a) alerting the user to a similar question to the submitted question which has been posted on the second website in the second language and b) posting the translated question on the second website and notifying the user of answers to the translated question that are posted on the second website by other users.

In accordance with another aspect, a method for facilitating cross-language question answering includes providing for a graphical user interface to be displayed which enables a user to submit a question in a first language, translating the submitted question in the first language into a second language, optionally alerting the user to a similar question to the submitted question which has been posted on the second website in the second language and providing for the translated question to be posted on the second website and for notifying the user of answers to the translated question that are posted on the second website by other users.

In accordance with another aspect, a cross-language system for facilitating question answering includes memory which stores a plurality of archives, each of the archives comprising questions and answers to the questions posted on a website, the questions and answers in a first of the archives being predominantly in a first language. The questions and answers in a second of the archives being predominantly in a second language. A machine translation system is provided for translating user queries into at least one of the first and second languages. A search engine is provided, configured for querying the first and second archives based on the user queries and user queries translated by the machine translation system. The system is configured for generating a user interface on an associated user terminal in communication with the system which allows a user to enter a query in the user's language, and for displaying a representation of responses to the queries retrieved from the archives by the search engine.

In accordance with another aspect, a method for facilitating cross-language question answering includes providing for the display of a graphical user interface which enables a user to submit a query in a first language. A submitted query in the first language is translated into a query in a second language. Based on the translated query, the method includes querying an archive of stored questions and corresponding answers that have been posted on a community question answering website which are predominantly in the second language and retrieving a set of responsive stored questions and corresponding answers. Provision is made for a representation of responses to the queries retrieved from the archives to be displayed to the user.

DETAILED DESCRIPTION

As used herein, a community question answering (CQA) website is a site which allows users to post questions and receive answers in their own language. The exemplary embodiment provides a web-based user interface with tools for crossing language barriers, by providing automatic translation of questions and answers and queries. As used herein a "query" is a search of previously submitted questions and/or answers which may be archived by category, such as sports, politics, etc.

The exemplary interface permits a significant increase in the size of the answering community by pooling across languages. It also makes it more feasible to establish sites for many countries where the current pool of the on-line community is too small for a national website to exist independently.

Figure 1:
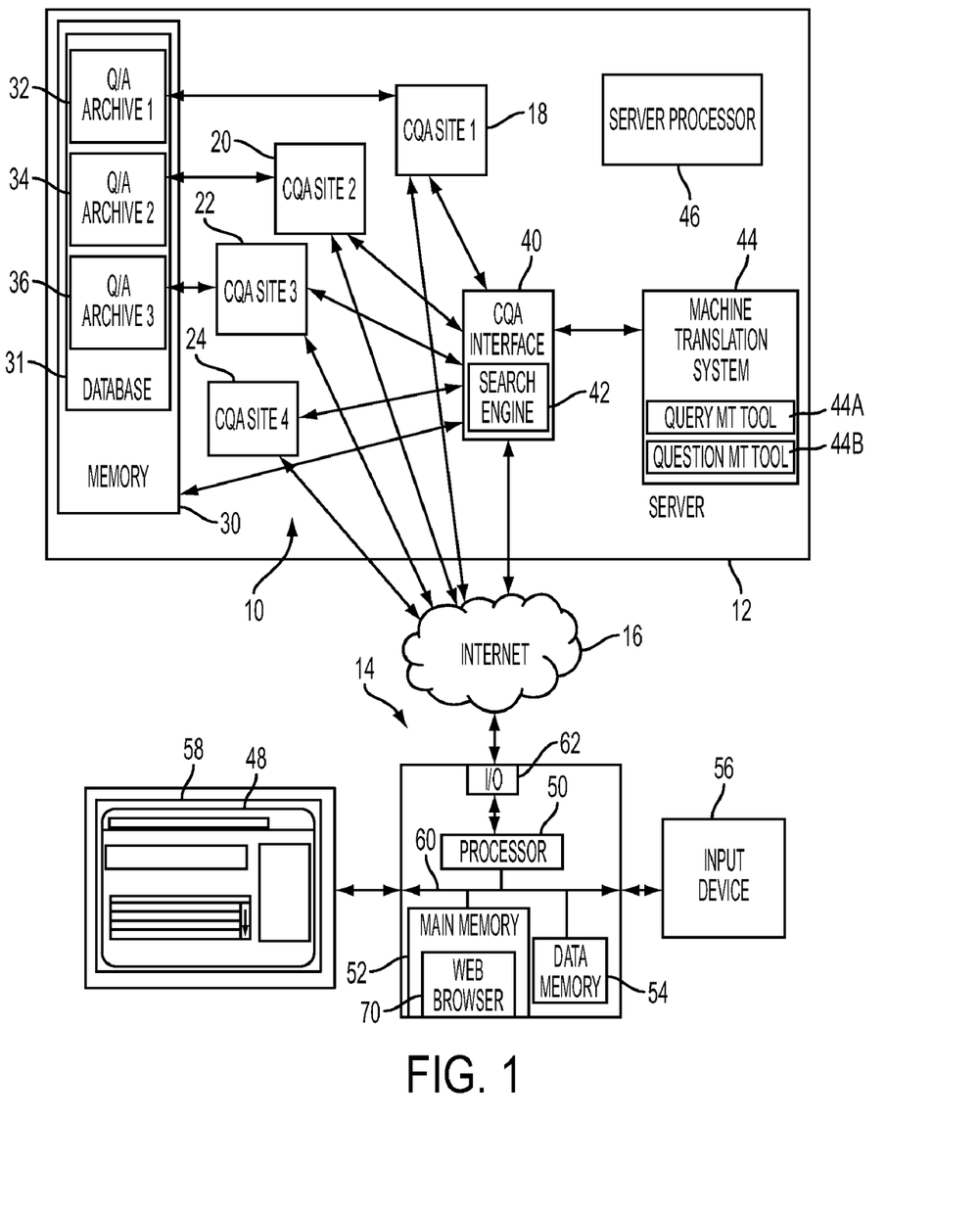
FIG. 1 is a functional block diagram of a system for facilitating question answering in accordance with one aspect of the exemplary embodiment.

FIG. 1 illustrates a block diagram view of a cross-language system 10 for question answering, in accordance with one exemplary embodiment. The system 10 may be hosted by a server computer 12. The server computer communicates with a user interface terminal 14 in the form of a computing device, such as a personal computer, laptop, palmtop computer, portable digital assistant (PDA), cellular telephone, or other device with computing and communication capability. For example, terminal 14 is linked via wired or wireless link(s) 16, such as a local area network (LAN) or wide area network (WLAN), such as the Internet, with the server computer 12. As will be appreciated, many such terminals 14 may access the server computer. Server computer 12 may comprise a single computing device or several such devices.

The server computer 12 (which as noted above may be a single device or several computing devices) hosts a number of CQA websites 18, 20, 22, 24 (four in the illustrated embodiment, although any number of such websites may be hosted), each for a respective country and/or language, such as Argentina, Australia, Brazil, Canada, China, France, Germany, Hong Kong, India, Indonesia, Italy, Japan, Malaysia, Mexico, New Zealand, Philippines, Quebec, Singapore, South Korea, Spain, Taiwan, Thailand, United Kingdom, United States (English), United States (Spanish). While the CQA websites are described in terms of country-based websites, it is contemplated that other types of geographical region may be represented by the websites, e.g. regions grouping two or more countries with a common language, or a part of a country, such as a French-speaking region of Switzerland. Each website is accessible through a representation of its IP address, e.g., in the format www. - - - .com, or other suitable address. In other embodiments, a link to the network server is displayed on the user terminal, e.g., through installation of appropriate software on the user terminal. The website may cause Web pages to be displayed by the user terminal 14, which maybe be written in Hypertext Markup Language ("HTML") or other commonly understood format. In yet other embodiments, a user posting a question may periodically receive a link to the site via email.

The server computer 12 includes a memory 30. The memory 30 may be located internally within a single server computer 12. Alternatively, the memory 30 may be distributed over several memory devices located in different computers and accessible to a common server via suitable wired or wireless links. The memory 30 stores a database 31, which includes, for some or all of the CQA websites 18, 20, 22, a respective archive 32, 34, 36 of past user posted questions and corresponding answers (in the illustrated embodiment, site 24 has no corresponding archive). The questions and their answers may be indexed by topic, such as sports, politics, gardening, and the like. In each archive 32, 34, 36 of questions and answers, each answer is associated with a single one question. A question may however, be associated with multiple answers. In each archive, the questions and answers are generally in the language of the respective national website 18, 20, 22. In one embodiment, the questions of each archive 32, 34, 36 are stored in a respective question sub-archive and/or indexed as being questions, with the answers being stored in a separate answers sub-archive and/or indexed as being answers to a specific question. Each CQA website 18, 20, 22, 24 is linked to a common multi-lingual CQA interface 40 which includes a search engine 42. The search engine 42 may include multiple search engines, e.g., each archive has a respective search engine configured for querying that archive or each language has its own search engine. In other embodiments, the search engine 42 is a single search engine configured for searching all the archives.

The CQA interface 40 also includes or accesses a machine translation system 44. Various machine translation systems (machine translation tools) may be suitably employed in the exemplary system 10. Examples of statistical machine translation systems are disclosed, for example, in U.S. Pat. Nos. 5,477,451, 6,304,841, 6,182,026, and US Pub. Nos. 2004/0024581, 2004/0030551 and 2007/0150257, the disclosures of which are incorporated herein in their entireties by reference. Methods for cross-lingual text mining are also discussed in Carol Peters, Valentin Jijkoun, Henning Müller, Douglas W. Oard, Anselmo Peñas, Vivien Petras, Diana Santos (Editors) Advances in Multilingual and Multimodal Information Retrieval: 8th Workshop of the Cross-Language Evaluation Forum, CLEF 2007, Springer, 2008; Blaz Fortuna and John Shawe-Taylor, in: Learning With Multiple Views, workshop at the ICML, Aug. 11, 2005, Bonn, Germany; and E. Gaussier, J.-m. Renders, I. Matveeva, C. Goutte, H. Déjean, A geometric view on bilingual lexicon extraction from comparable corpora, in Proceedings of ACL-04(2004).

The memory 30 may represent any type of computer readable medium such as random access memory (RAM), read only memory (ROM), magnetic disk or tape, optical disk, flash memory, or holographic memory. Memory 30 may be resident on a single computing device or spread across several computer devices and/or memory storage devices.

The CQA interface 40, search engine 42, machine translation system 44, and websites 18, 20, 22, 24 may each be in the form of software, hardware, or a combination thereof. In one embodiment, each of these components includes software instructions stored in memory, which may be the same memory as memory 30 or a separate memory. The instructions are executed by a server processor 46 (such as a CPU, or a set of discrete processors), which controls the operation of the server.

The system 10 is configured for generating a graphical user interface (GIU) 48 in cooperation with the user's terminal 14. Each terminal 14 may include a processor 50, such as a CPU, which controls the overall operation of the terminal by execution of processing instructions which are stored in main memory 52, connected to the processor. The terminal 14 may further include data memory 54, a user input device 56, such as a keyboard, touch screen, cursor control device, microphone with voice recognition software, or combination thereof, and a display 58, such as a screen, on which the GUI 48 is hosted. Components of the terminal may communicate with each other via a data control bus 60. A network interface 62, such as a modem, allows the computer to communicate with other devices via links, such as link 16.

Each of the computer terminals 14 includes a web browser 70, which is configured for accessing websites such as the CQA websites 18, 20, 22, 24 hosted by the server. The web browser 70 may be a software application which includes software instructions stored in main memory 52 and which are executed by processor 50. The web browser application 70 enables a user to display and interact with text, images and other information located on the website hosted by the server 12. A user may access a selected website by typing in a web address which is a representation of the selected website's IP address. The website may then cause Web pages to be displayed by the user terminal 14, which maybe written in Hypertext Markup Language ("HTML") or other commonly understood format. In other embodiments, a link to the website is displayed on the user terminal, e.g., through installation of appropriate software on the user terminal. In yet other embodiments, a user may receive a link to the site via email, e.g., when answers are posted.

The web browser 70 accesses the website and is caused to display the graphical user interface 48, e.g., on the screen 58 of the computer terminal 14, when a user of the terminal accesses one of the CQA websites 18, 20, 22, 24. The user may interact with the user interface 48 using the user input device 56. The web page information and user inputs may be stored temporarily in data memory 54.

Using the interface 48, registered users of a CQA website such as website 18 can browse "active" questions and write an answer. The registered users can also post questions in the appropriate language, manually assigning it to a specific category (e.g., Home & Garden→Decorating & Remodeling). A user who posted the question is notified of all answers, and is asked to select the best one within a certain time interval, after which other users can vote on submitted answers, e.g., by rating them as to how useful they are. Besides posting new questions, users can also query and browse the respective archive 32, 34, 36 of questions and answers that were already posted. All users may receive "points" based on their activity: posting questions, answering questions, having an answer selected as the "best" by the poster or by the community, etc.

The CQA sites 18, 20, 22, 24 are enhanced, in the exemplary embodiment, by integrating in the interface 48, automatic tools to help crossing language barriers. These tools may include one or more of: 1) a cross language existence check for similar posted questions, 2) cross language posting of questions and retrieval of posted answers, and 3) cross language information retrieval, as described in further detail below.

1. Cross-Language Existence Check of Questions and Translation of Answers

Figure 2:
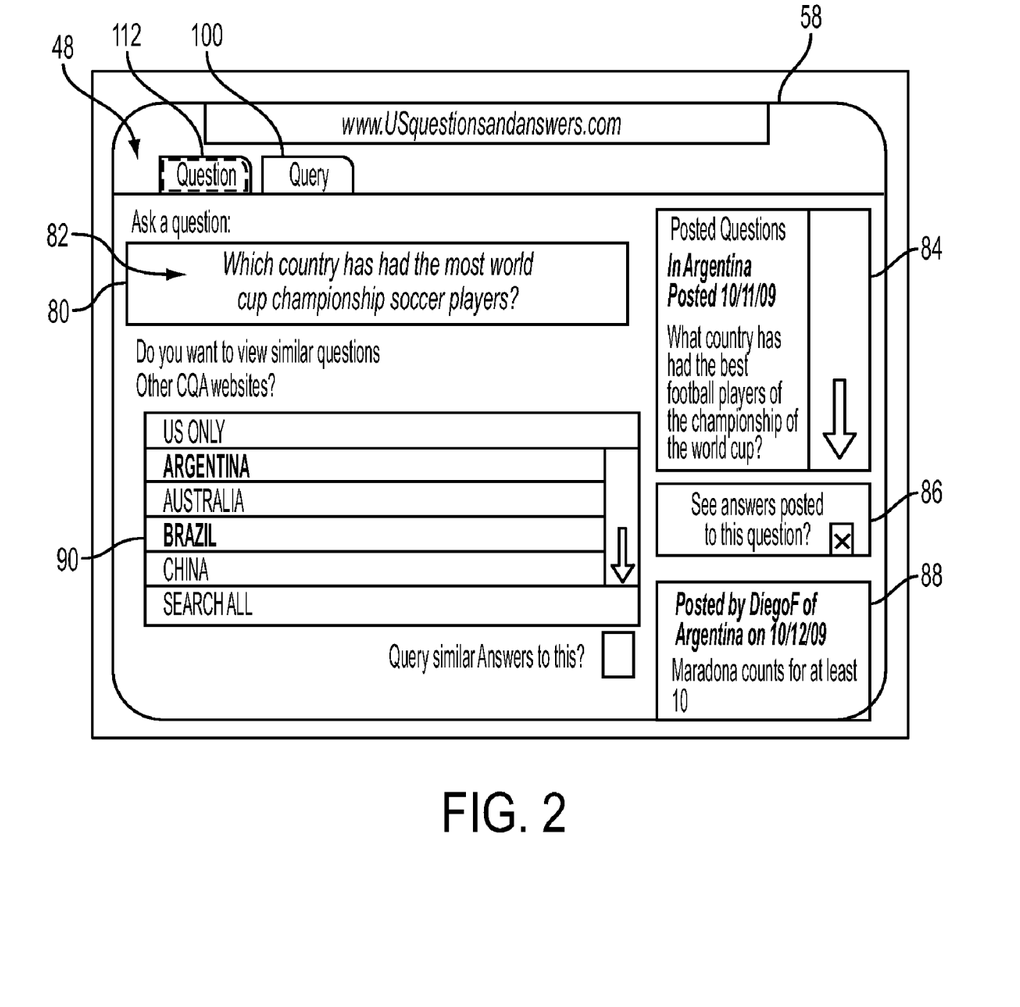
FIG. 2 is an exemplary screenshot of a graphical user interface displayed by the system on a user's terminal for input of a user's question, the screenshot showing similar questions posted on one or multiple community question answering (CQA) websites.

A first functionality provided by the interface 48 is actuated when a user submits a question in a given language. As illustrated in FIG. 2, which shows a screenshot of an exemplary user interface 48, an active area 80 of the screen is provided for the user's question 82. The interface 48 informs the user that the same question (or a very similar question) has been posted on another national site of the same CQA system 10. The user can then be given the opportunity to review the posted question(s) and/or retrieve the corresponding answers, either in their native language or in the user's own language by having them automatically translated into that language. In the illustrated embodiment, the user interfacing with the US CQA website 18 wants to know Which country has had the most world cup championship soccer players? The interface communicates the question to the national US CQA website 18, which accesses the CQA interface unit 40. The interface unit translates the question into different languages using the machine translation tool 44 and uses the database archives 34, 36 of the other CQA websites to identify any matching questions. In the exemplary embodiment, the interface unit identifies that a similar question has been posed on the Argentinean CQA website 20 and the user is presented with the question and answer, translated from Spanish to English, e.g., as illustrated in area 84 of the screen. The user may select to see answers to the posted question, e.g., by clicking on an active area 86 of the screen, such as a check box or the area 84 of the posted question. The answers may be displayed in a scrollable area 88.

In one embodiment, the user interface 48 automatically uploads the user's question to the CQA interface 40, optionally while the user is in the process of editing it, allowing the user to be informed of the existence of a question or questions with a very similar meaning in one or more of the question archives of the same or other websites.

The process of identifying similar questions may proceed substantially automatically, as described above. In other embodiments, the user may be provided with the option for the system to limit the search of other archives e.g., by selecting, e.g., from a drop down box 90, which countries, continents, or other regions that he is interested in having searched for similar questions. For example, the user may click on, highlight, or otherwise select the countries Argentina and Brazil, in which case, his question is translated into Spanish and Portuguese and searched in the archives of these countries.

The user may be permitted to specify that the user who asked questions in other languages which are equivalent to a given question in his language is not the same user who posted the question in the first place. In another embodiment, a user can ask to be provided with a list of answers on several national CQA sites which are all similar to a given answer.

In order to be able to reliably find questions which are similar, without requiring an exact match, the retrieval method may employ both standard text indexing as well as computing the similarity between spans of text written in different languages. Various methods exist, which can be loosely divided into translation based approaches and latent semantic approaches. In translation based approaches, one of two text spans (generally the user's question) is translated into the language of the other (the archived question) using a bilingual dictionary, which may be manually crafted or automatically extracted from parallel and/or comparable corpora (see, for example, Stephane Clinchant and Jean-Michel Renders: Query Translation through Dictionary Adaptation, in Carol Peters et al. (eds.) Advances in Multilingual and Multimodal Information Retrieval, Springer, 2008; Eric Gaussier, Jean-Michel Renders, Irina Matveeva, Cyril Goutte, Hervé Déjean: A Geometric view on bilingual lexicon extraction from comparable corpora, in the proceedings of the 42nd Annual Meeting of the Association for Computational Linguistics, Barcelona, Spain, Jul. 25-26, 2004.; and U.S. Pub. No 20080262826, entitled METHOD FOR BUILDING PARALLEL CORPORA, by Francois Pacull, the disclosure of which is incorporated herein by reference in its entirety). A measure of similarity can then be computed, e.g., as string kernel, as described, for example, in U.S. Pub. Nos.

20040128288 to Cancedda, and 20070150257 and 20070365825 to Cancedda, et al. ("Cancedda"), the disclosures of which are incorporated herein by reference in their entireties.

A string kernel is a similarity measure between two sequences of symbols (e.g., words) over the same alphabet, where similarity is assessed as the number of occurrences of (possibly noncontiguous) subsequences shared by two sequences of symbols; the more substrings in common, the greater the measure of similarity between the two sequences of symbols. The methods of Cancedda are able to account for short gaps between words (here, one or more non matching words in the user's question and/or archived question) and thus are able to find questions which do not exactly match but are more likely to convey the intent of the question.

In techniques employing so-called "latent semantic spaces" an abstract vector space is defined based on the statistical probabilities of a parallel corpus. The text spans are represented as vectors in this space and their similarity measured using techniques applicable to vectors, e.g., latent semantic analysis (LSA), probabilistic latent semantic analysis (PLSA), hierarchical probabilistic latent semantic analysis (HPLSA), canonical correlation analysis (CCA), and variants thereof, such as kernel canonical correlation analysis (kCCA), and the like. (See, for example, Susan T. Dumais: Latent Semantic Analysis, Annual Review of Information Science and Technology (ARIST), vol. 38 p. 189-230 (2004); Thomas Hofmann: Unsupervised Learning by Probabilistic Latent Semantic Analysis, Machine Learning, vol. 42, n. 1-2, January 2001; Eric Gaussier, Cyril Goutte, Kris Popat, Francine Chen: A hierarchical model for clustering and categorising documents, in Advances in Information Retrieval—Proceedings of the 24th BCS-IRSG European Colloquium on IR Research (ECIR-02), Glasgow, Mar. 25-27, 2002. Lecture Notes in Computer Science 2291, pp 229-247, Springer; Alexei Vinokourov, John Shawe-Taylor and Nello Cristianini: Inferring a Semantic Representation of Text via Cross-Language Correlation Analysis, in ADVANCES IN NEURAL INFORMATION PROCESSING SYSTEMS (2003); D.R. Hardoon, S. Szedmak, J. Shawe-Taylor: Canonical Correlation Analysis: An Overview with Application to Learning Methods, in Neural Computation, 2004—MIT Press).

Using one or more of these approaches, questions can be scored and ranked according to a measure of their similarity. The most similar ranked questions, and their associated answers, can be presented to the user, e.g., translated into his CQA site's language.

2. Question Posting

Figure 3:
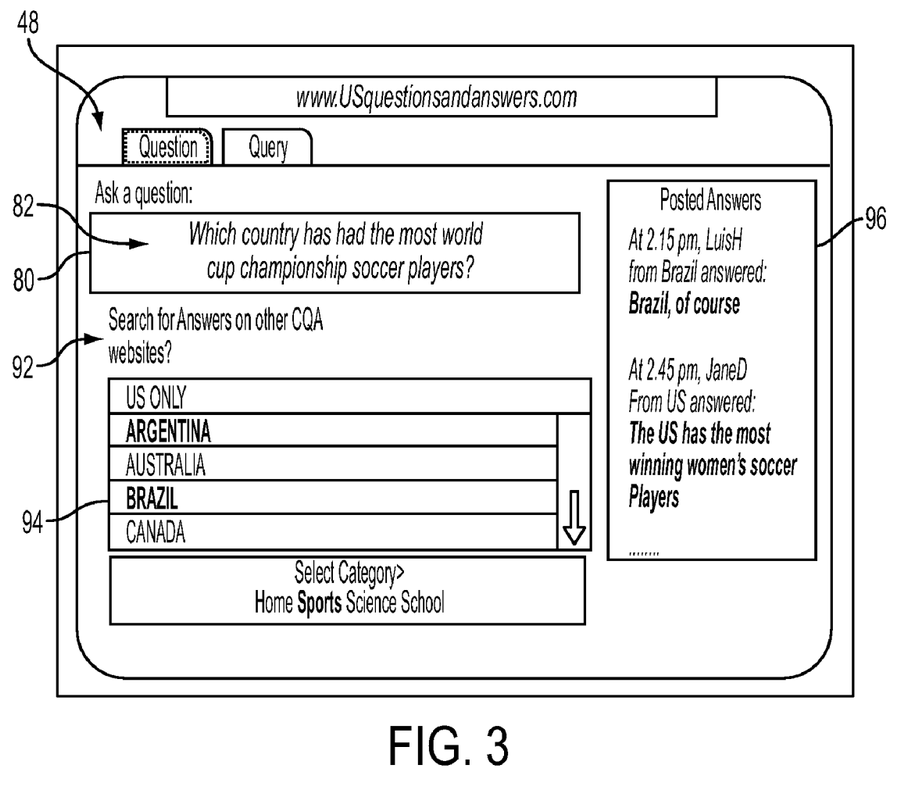
FIG. 3 is an exemplary screenshot of the graphical user interface for input of a user's question, the screenshot showing a list of countries for the question to be posted on one or multiple community question answering (CQA) websites.

If the user finds that the check performed to see if there have been similar questions posted on other websites has not identified a question which is sufficiently similar, or if the answers are not useful, the user may decide to post the question. As shown in FIG. 3, the user may be prompted (as at 92) by the interface 48 to select whether to have the question 82 translated into different languages and posted on other CQA websites 20, 22, 24. For example, the user may decide to have the question posted on the national CQA websites of Argentina and Brazil, as well as in the US by clicking on, highlighting or otherwise selecting those countries on the drop down menu 94 or other active portion of the screen. The US website (in the present example), communicates the request to the CQA interface 40, which translates the question into Spanish and Portuguese and posts the questions on the Brazilian and Argentinean websites. Any answers posted on these other sites can be transmitted to the CQA interface 40 and translated back to English and posted on the US website where the question poster can review them as they arrive, e.g., at 96. He may additionally or alternatively be notified by email when answers are posted.

Such an option is useful for gauging opinions in different countries. For example, if a user thinks that the CQA community in his country may be biased on a particular topic, the user may wish to see opinions from other countries. For example, the user may want to know whether a referee of a World Cup soccer game was correct in granting a penalty to one country. Since the respective CQA communities in the two countries playing the game may be expected to be biased, the user asks to post the question in one or more third countries. The CQA interface automatically translates the question into the languages of the selected countries and posts the translated question on the respective national websites. These translations may be posted with a notice that the text is issued from an automatic translation on the respective CQA national sites. Answers from each of the sites can then be automatically routed, optionally translated, to the user.

3. Cross Language Information Retrieval on Existing Questions and Answers

Figure 4:
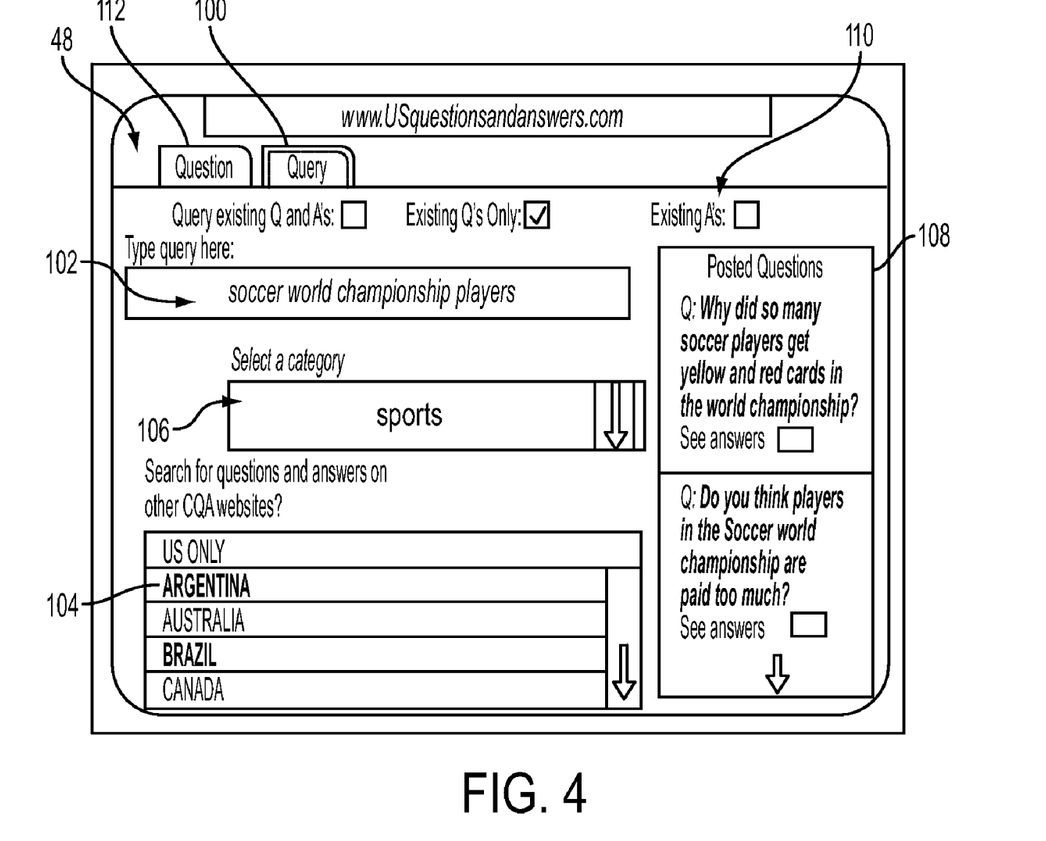
FIG. 4 is an exemplary screenshot of the graphical user interface for input of a user's query, the screenshot showing a list of countries for the query to be searched in archives of one or multiple community question answering (CQA) websites.

Each CQA website 18, 20, 22 may offer search facilities for querying the respective archive 32, 34, 36 of existing questions and answers. Querying may be done by keyword or natural language searching, e.g., in a selected one of the categories, such as sports, home etc. FIG. 4 illustrates an exemplary screenshot of a query page of the website (accessed in the exemplary embodiment by a tab 100). In this embodiment, the user interface 48 provides additional functionality by proposing a Cross-Lingual Information Retrieval (CLIR) option, by which a user can specify that a query 102 (not to be confused with a "question 82", discussed above) should be not only addressed to a certain CQA national site 18, but should be translated into some selected languages and addressed to a set of selected national CQAs, for example, by selecting countries via a drop down menu 104, and a suitable category 106. In this embodiment, the CQA interface 40 uses a translation tool, which may be the same or a different translation tool from the tool 44 used to translate questions and answers, to convert the user query 102 into a translated query for querying the respective archives of the selected CQA national sites, such as sites 20, 22. In the illustrated embodiment, the machine translation tool 44 includes two machine translation (MT) tools 44A, 44B, one for translating questions and answers, the other for translating queries. The MT tool or tools may be in the form of software applications which are executed by a processor, such as processor 46. MT tools 44A, 44B may be located in the same memory structure (e.g., memory 30) or in separate memory structures.

The search engine 42 performs a search of the archives 20, 22 with the machine translated query, after appropriately formatting it (e.g., by adding AND and OR operators). The search engine 42 is capable of returning, to the user, a list of questions and answers from the archives which may be ranked in descending order of relevance with respect to the user query 102. Retrieved questions and answers may be returned to the CQA interface 40. In the exemplary embodiment, the CLIR option may usefully be coupled with a machine translation option, so that retrieved questions and answers in a language different from the language of the user are automatically translated into the language of the user. With this translation, for example, the US user of the system could have the relevant questions and answers that were posted on the Brazilian and Argentinean sites translated into English, and thus have a larger pool of hits to review.

The results of the query may be ranked according to a predefined ranking criterion. Various methods exist for performing CLIR, including methods for merging ranked lists of query matches in different languages into a single, multilingual ranked list (see for example, Martin Braschler, et al. Cross-Language Information Retrieval (CLIR) Track Overview, in *Proceedings of the Eighth Text Retrieval Conference* (TREC8), and references cited therein).

The user interface 48 then displays to the user a representation of the list returned by the search-engine 42 (e.g., as shown at 108).

In one embodiment, the user may be given the opportunity to have the query searched among both questions and answers in the selective archives. Or, the user may be permitted to select query results only from the answers or only from the questions in the selected archives, e.g., as shown at 110. Further, the user interface 48 may allow a user to upload an answer in a first language L into the corresponding answer archive, and associate it with a question in language L in the corresponding question archive.

In general, a user may start by CLIR querying of the archives and if nothing relevant is found, post a question, as described in sections 1 and 2 above. In the exemplary embodiment the pages for querying and question posting are accessed by respective tabs 100, 112, although in other embodiments other links may be provided or provision may be made for both querying and questioning on the same page.

As will be appreciated, while for ease of description in the examples above, reference has been made to the user being a US user, it is to be appreciated that the user can be a user of any of the national CQA websites. In one embodiment, where the user's potential online community is small, all questions may be automatically sent to the CQA interface 40 without posting on a national website. Further, there may be no archive associated with the user's selected website, as is the case with CQA site 4.

While some of the above-described functionalities could, in principle, be obtained by a user manually repeatedly cutting and pasting questions and answers to and from on-line automatic translation services, the integration of the tools in the CQA site 12 itself significantly improves its ease of use. An integrated Multilingual CQA system of this type may also help improve mutual understanding between different linguistic communities.

Figure 5:
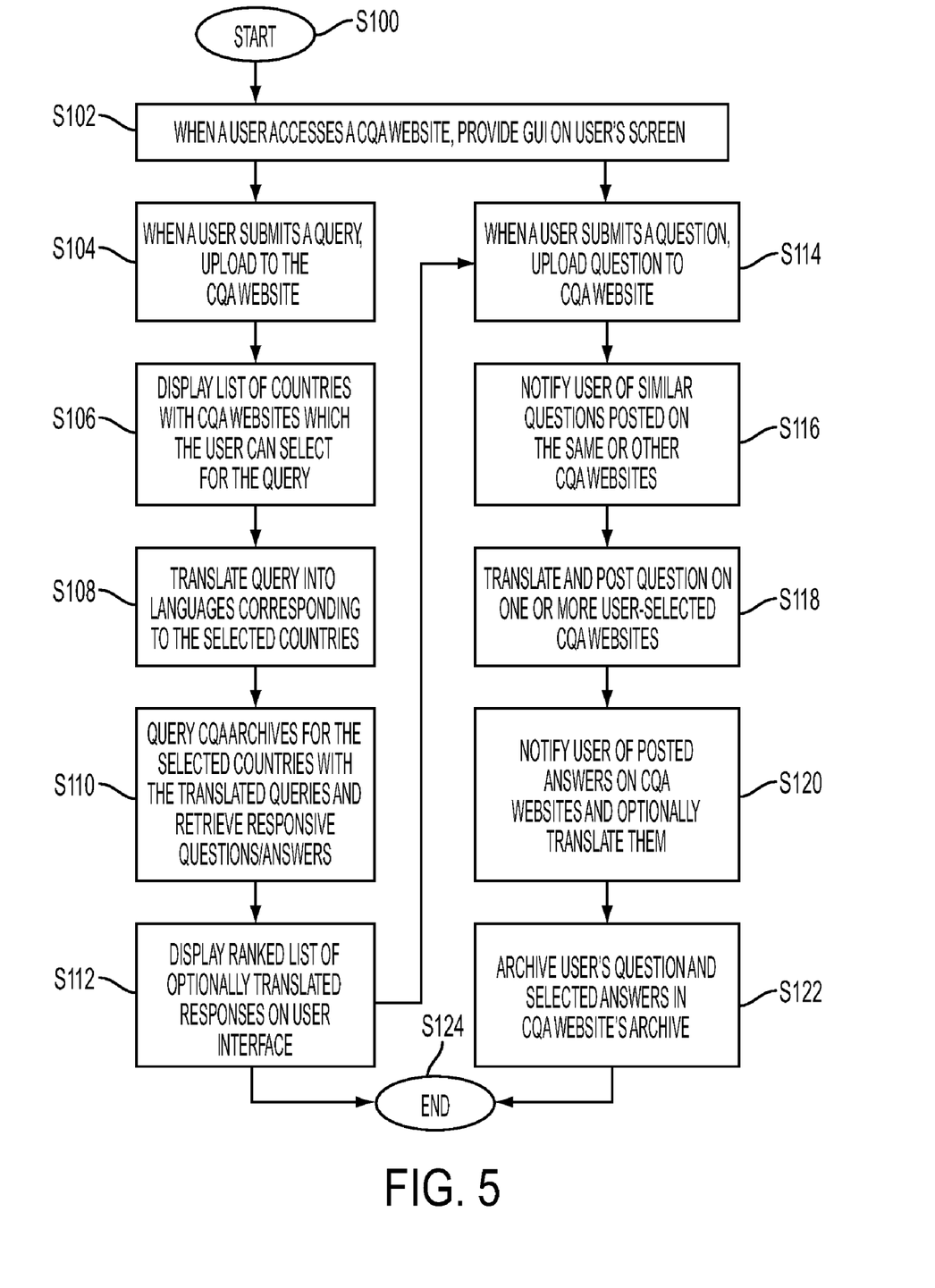
FIG. 5 illustrates a method for facilitating question answering in accordance with another aspect of the exemplary embodiment.

FIG. 5 illustrates an exemplary method for cross language querying and/or question answering. The method starts at S100.

At S102, in response to a user entering the address of a community question answering website on his browser, a graphical user interface is provided on the user's screen which enables a user to submit a question or query in a first language (the language commonly used on the selected community question answering website).

At S104, in response to a user submitting a query, the submitted query is uploaded to the CQA website.

At S106, the user interface may provide the user with the option of selecting one or more of a displayed list of countries (or geographical regions/languages). Each listed country has a corresponding community question answering website. At least some of the displayed list of countries use a different language from the first language. The user can select one or more of the countries for the query to be submitted to the corresponding community question answering website(s).

At S108, the query in the first language is machine translated into a query in at least one second language for the country or countries selected.

At S110, based on the translated query, an archive of stored questions and corresponding answers that have been posted on the community question answering website (which are predominantly in the second language) is queried by the search engine and a set of responsive stored questions and corresponding answers is retrieved (if there are any).

At S112, a representation of responses to the queries retrieved from the archives is displayed on the user interface. These may be displayed as a ranked list, optionally translated, as appropriate, into the first language.

At S114, which may occur contemporaneously with step S102, the user interface provides for the user to enter his own question to be uploaded to the community question answering website and posted there and/or translated into one or more second languages for posting on other community question answering websites.

At S116, the user may be notified of similar questions posted on other community question answering websites and have the opportunity to review them on the user interface, optionally having them machine translated into the first language.

At S118, the user is notified of answers that have been posted in response to his question with the option of having them translated from the second language into the first language by machine translation.

At S118, the user may be given the opportunity to select the best answers, which are then archived in his community question answering website archive and optionally also in the archives of the CQA websites on which his question was posted.

The method ends at S120.

The method illustrated in FIG. 5 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 5, can be used to implement the method for question answering.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A cross-language system for facilitating question answering comprising:
   a server which hosts a plurality of community question answering websites, one for each of a plurality of countries, a first of the websites using a first language and a second of the websites using a second language, each of the websites configured for generating a graphical user interface to be displayed on a terminal of a user accessing the website;

a machine translation system which translates a question submitted by the user to the first website in the first language into the second language; and the cross-language system being configured for:

alerting the user to a similar question to the submitted question which has been posted on the second website by a past user in the second language, wherein the similar question is determined using a computed similarity measure; and posting the translated question on the second website and notifying the user of answers to the translated question that are posted on the second website by other users.

2. The cross-language system of claim 1, further comprising:

memory which stores a plurality of archives, each of the archives comprising questions and answers to the questions posted by past users on a respective one of the websites, the questions and answers in a first of the archives being predominantly in the first language, the questions and answers in a second of the archives being predominantly in the second language.

3. The cross-language system of claim 2, wherein the machine translation system or a second machine translation system is configured for translating user queries into at least one of the first and second languages; and the cross-language system further comprising a search engine configured for querying the first and second archives based on the user queries and user queries translated by the machine translation system.

4. The cross-language system of claim 3, wherein the user interface is configured for allowing a user to enter a query in the user's language, and for displaying a representation of responses to the queries retrieved from the archives by the search engine.

5. The cross-language system of claim 4, wherein the responses each comprise at least one of a question and an answer.

6. The cross-language system of claim 2, wherein each answer in each archive is associated with a single question.

7. The cross-language system of claim 1, wherein the corss-language system is hosted by a server which forms a communication link with the associated user terminal via the Internet.

8. The cross-language system of claim 3, wherein the search engine is configured for querying selected ones of the archives and returning a list of questions and answers from the selected archives ranked in descending order of relevance with respect to a user query.

9. The cross-language system of claim 3, wherein the cross-language system is configured for presenting a list of countries to the user via the user interface, the search engine querying archives corresponding to the countries selected by the user from the list.

10. The cross-language system of claim 1 wherein the server comprises at least one computing device.

11. The cross-language system of claim 7 wherein each of the plurality of community question answering websites is associated with a respective one of the archives where questions and answers posted on the website are archived.

12. The cross-language system of claim 1, wherein the user interface allows a user to submit a question in the first language and have it uploaded to the system and translated by the machine translation into at least the second language for posting on at least one community question answering website using the second language, the cross-language system returning to the user at least some of the answers to the translated question that are posted by users of the community question answering website on which the translated user question is posted.

13. The cross-language system of claim 12, wherein the cross-language system returns to the user a ranked list of the answers via the user interface.

14. The cross-language system of claim 12, wherein the machine translation system translates at least some of the posted answers prior to the cross-language system returning them to the user.

15. The cross-language system of claim 12, wherein the user interface is configured for notifying the user when an answer is associated with a question that was submitted by the user.

16. The cross-language system of claim 1, wherein the user interface is configured for presenting a list of countries to the user via the user interface, and for posting translations of the user's question on community question answering websites of those countries selected by the user from the list.

17. The cross-language system of claim 1, wherein the user interface is configured for receiving a question submitted by a user for posting on a first community question answering website using the user's language and for notifying the user of the existence of a question similar to a question submitted by the user which has been posted in another language on a second community question answering website.

18. The cross-language system of claim 1, wherein the machine translation system automatically translates the user's submitted question into a plurality of different languages and a search engine queries a plurality of the archives to identify questions that are similar to the translated user's submitted question.

19. The cross-language system of claim 1 wherein the user interface is configured for uploading an answer submitted by the user to a question posted on a first community question answering website which is a machine translation of a question posed by another user on a second community question answering website.

20. The cross-language system of claim 1, wherein the second of the websites comprises a plurality of websites, each using a respective language.

21. A method for facilitating cross-language question answering comprising:

providing for a graphical user interface to be displayed which enables a user to submit a question in a first language to a first community question answering website;

translating the submitted question in the first language into a second language; and providing for alerting the user to a similar question to the submitted question which has been posted by a past user on a second community question answering website in the second language, wherein the similar question is determined using a computed similarity measure; and providing for the translated question to be posted on the second website and for notifying the user of answers to the translated question that are posted on the second website by other users.

22. A non-transitory computer program product encoding instructions, which when executed on a computer cause the computer to perform the method of claim 21.

23. A cross-language system for facilitating question answering comprising:
  memory which stores a plurality of archives, each of the archives comprising questions and answers to the questions posted on a respective one of a plurality of websites by past users, the questions and answers in a first of the archives being predominantly in a first language; the questions and answers in a second of the archives being predominantly in a second language;
  a machine translation system for translating user queries into at least one of the first and second languages, each query being a search of at least one of the previously submitted questions and the previously submitted answers; and
  a search engine configured for querying the first and second archives based on the user queries and user queries translated by the machine translation system;
  the cross-language system being configured for:
    generating a user interface on an associated user terminal in communication with the cross-language system which allows a user to enter a query in the user's language, and for displaying a representation of responses to the queries retrieved from the archives by the search engine, wherein the responses each comprise at least one of one of the previously submitted questions and one of the previously submitted answers, and
    alerting the user to a question posted on a second of the plurality of websites by a past user in the second language that is similar to a submitted question posted by the user on a first of the plurality of websites in the fist language, the similar question being determined using a computed similarity measure.

24. A method for facilitating cross-language question answering comprising:
  providing for a graphical user interface to be displayed which enables a user to submit a query in a first language;
  translating a submitted user query in the first language into a query in a second language;
  based on the translated query, querying an archive of stored questions and corresponding answers that have been posted on a second community question answering website by past users which are predominantly in the second language and retrieving a set of responsive stored questions and corresponding answers, each query being a search for at least one of the previously submitted questions and the previously submitted answers to the questions;
  providing for a representation of responses to the queries retrieved from the archives to be displayed to the user, the responses each comprising at least one of one of the previously submitted questions and one of the previously submitted answers; and
  providing for alerting the user to a question posted on the second community question answering website by a past user in the second language that is similar to a submitted question posted by the user on a first community question answering website in the first language, the similar question being determined by computing a measure of similarity.

25. A non-transitory computer program product encoding instructions, which when executed on a computer cause the computer to perform the method of claim 24.

* * * * *